July 18, 1961 R. AVERY 2,992,982
COUPLED FAST-THERMAL POWER BREEDER REACTOR
Filed Dec. 10, 1957 5 Sheets-Sheet 1
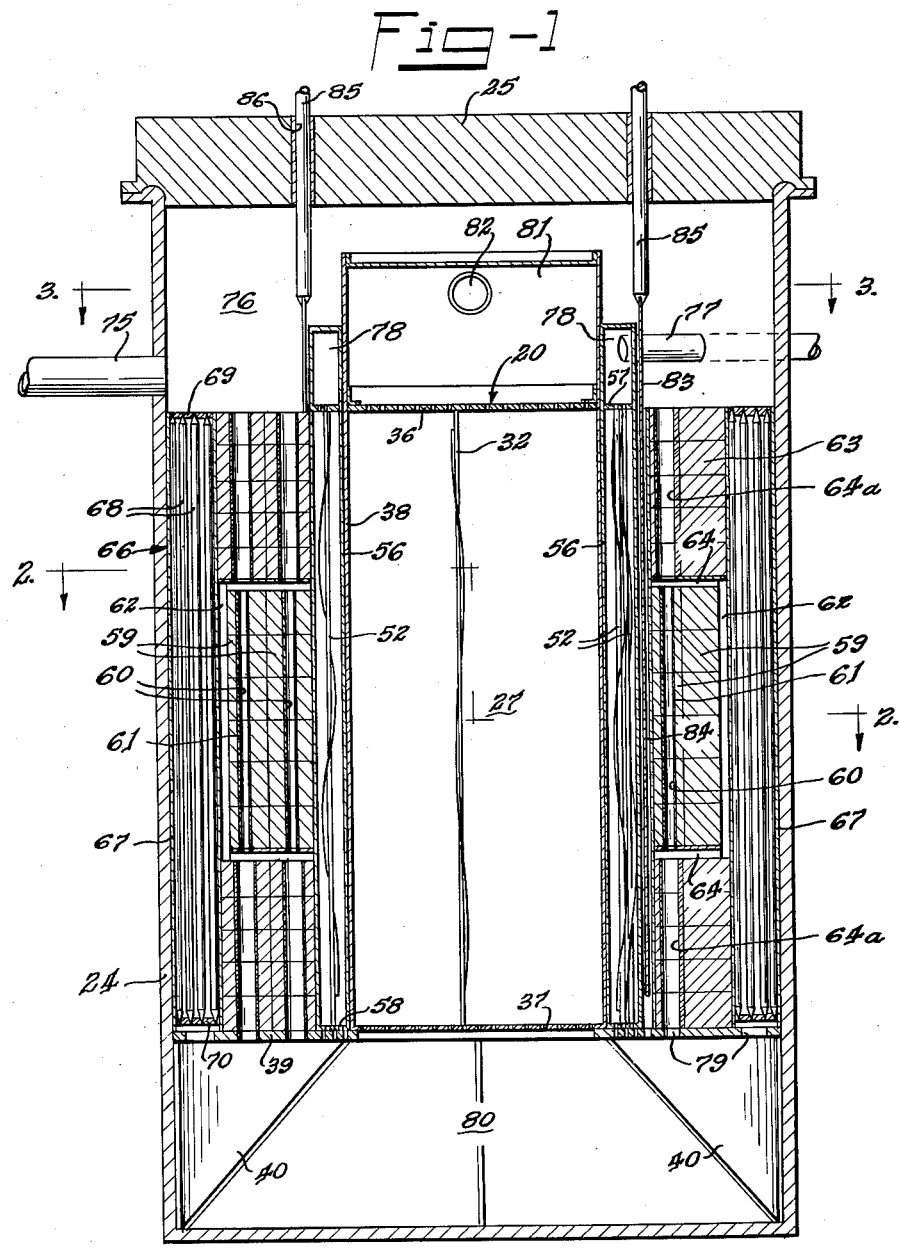
INVENTOR.
Robert Avery
BY
Roland A. Anderson
Attorney

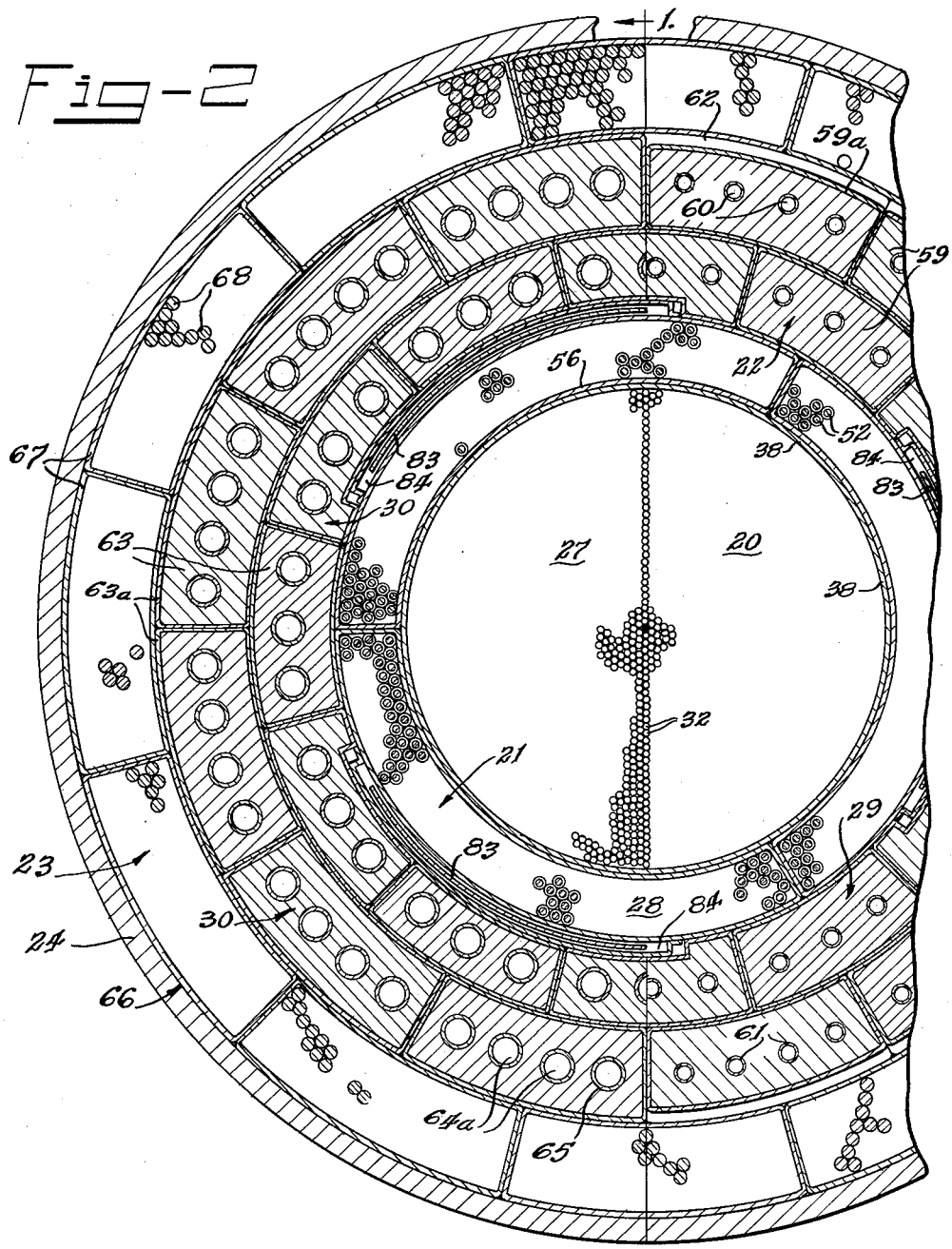

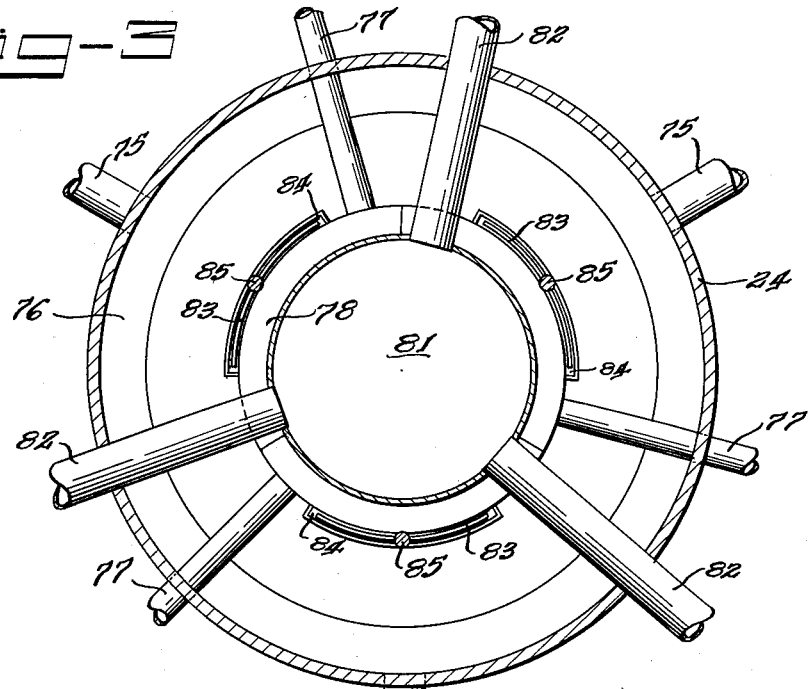
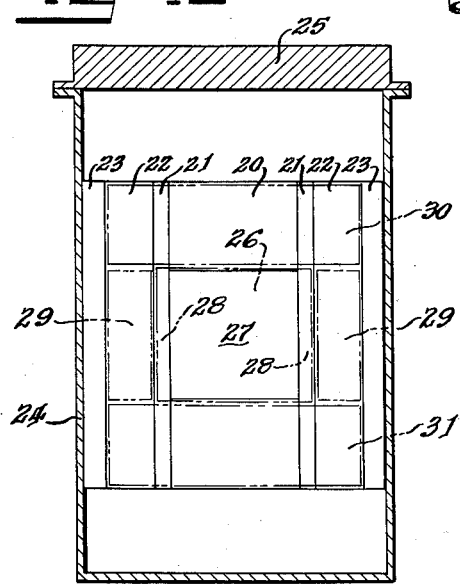
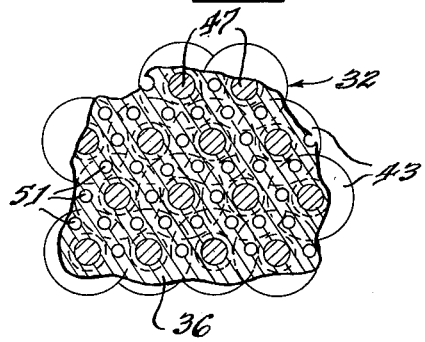

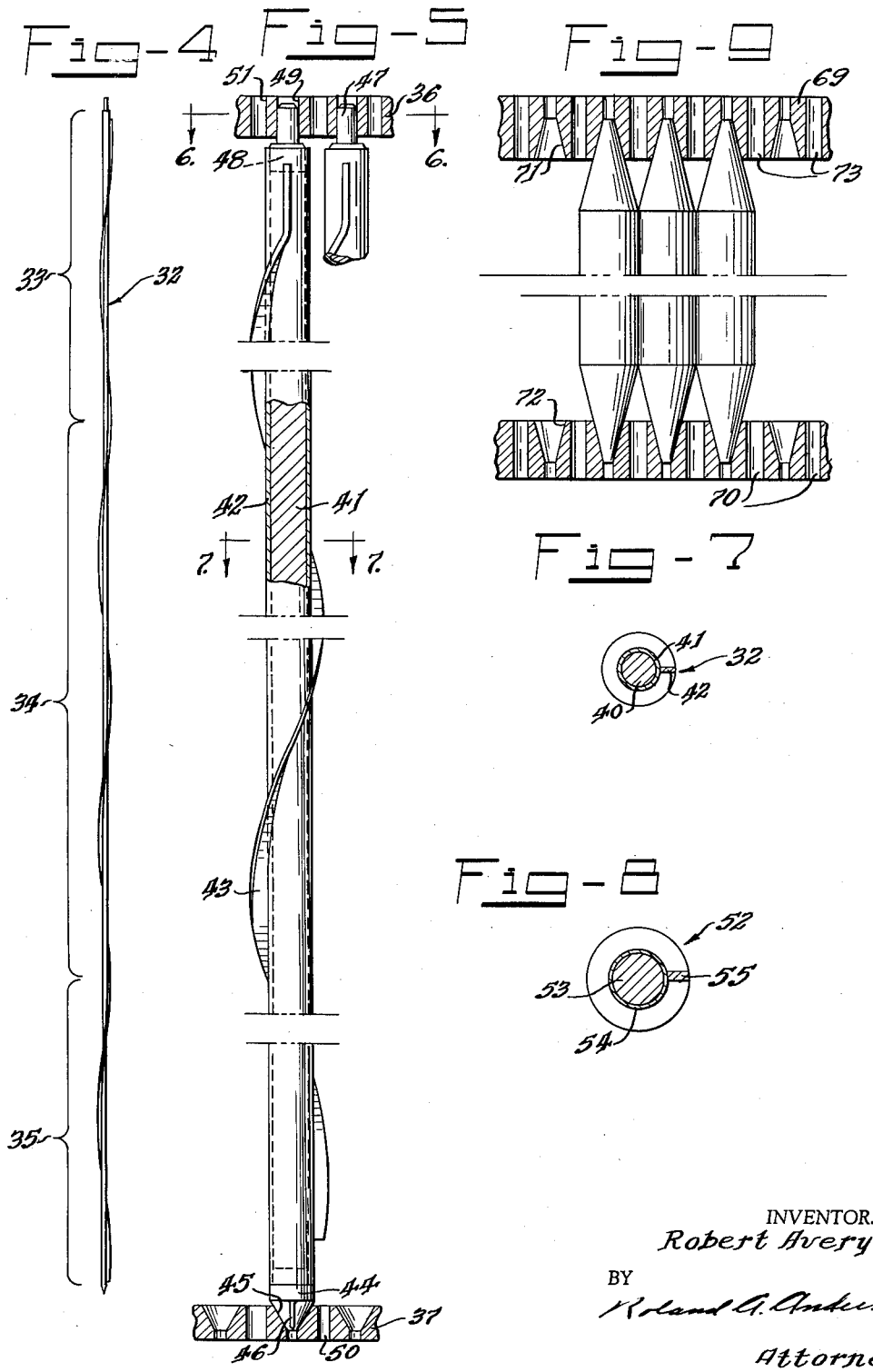

July 18, 1961 R. AVERY 2,992,982
COUPLED FAST-THERMAL POWER BREEDER REACTOR
Filed Dec. 10, 1957 5 Sheets-Sheet 5
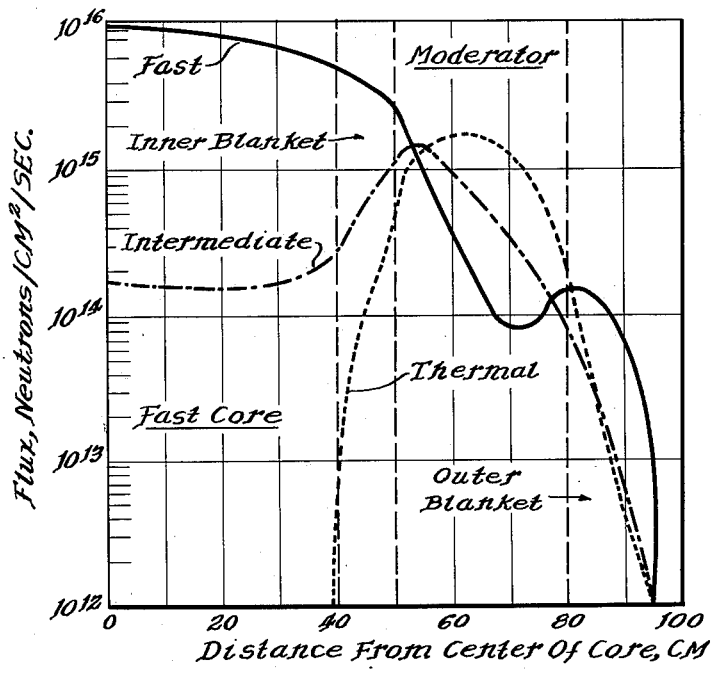
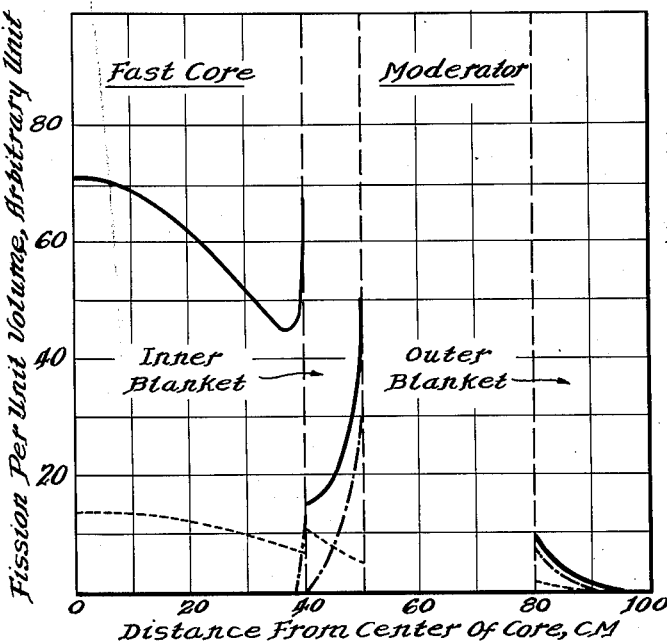
INVENTOR.
Robert Avery
BY
Roland A. Anderson
Attorney _United States Patent Office_

2,992,982
Patented July 18, 1961

2,992,982
COUPLED FAST-THERMAL POWER BREEDER REACTOR
Robert Avery, Elmhurst, Ill., assignor to the United States of America as represented by the United States Atomic Energy Commission
Filed Dec. 10, 1957, Ser. No. 701,945
2 Claims. (Cl. 204—193.2)

This invention relates to a nuclear reactor and, more particularly, to a reactor having coupled fast and thermal regions.

As used in this specification and in the appended claims, the following terminology is defined as indicated below:

Fissionable—Having the ability to undergo fission upon the absorption of a slow neutron.

Fertile—Having the ability to convert to fissionable material by absorption of a neutron.

Moderator material—A nongaseous material for which the ratio $$\frac{\epsilon \sigma_s}{\sigma_a}$$

is greater than 10, wherein $\epsilon$ is the average decrement in the logarithm of the energy of a fast neutron per elastic collision within the material, $\sigma_s$ is the thermal neutron elastic scattering cross section per atom of material, and $\sigma_a$ is the thermal neutron absorption cross section per atom of the material.

Slow neutron absorber—An atomic nucleus having a thermal neutron absorption cross section greater than 100 barns.

Breeding gain—The number of fissionable nuclei gained for each such nucleus consumed.

Neutron lifetime—Average time between successive neutron generations in the system under consideration.

Power density—Heat output per unit core volume.

Coupling—Fuel regions are said to be coupled if an appreciable number of neutrons originating in one region cause fissions in the other region.

Other terminology employed is used in the same sense that it is used in standard textbooks on the subject such as Science and Engineering of Nuclear Power, Addison Wesley Press, Inc., Cambridge, Massachusetts, vol. I (1947) and vol. II (1949), Elementary Pile Theory, H. Soodak and E. C. Campbell, John Wiley and Sons, New York, 1950, and The Principles of Nuclear Reactor Engineering, Glasstone, D. Van Nostrand Company, Inc., New York, 1955, which give a detailed description of the theory and practice of the design, construction and operation of reactors generally.

The energy level at which fissions in a chain reactive system occur depends not only on the composition of the system but also on the environment of the system. This energy level is defined herein as the operating energy level of the system.

Nuclear reactors are classifiable as fast, intermediate, or slow, depending upon whether they operate primarily on fast, intermediate or slow neutrons. Neutrons in the fast range have a kinetic energy greater than 10,000 electron volts; and neutrons in the slow range have a kinetic energy less than one electron volt. Neutrons in the intermediate range are classed as intermediate. Fast, intermediate, and slow reactors have all been constructed and operated.

The performance characteristics of these reactors were listed and discussed in patent application Serial No. 352,166, filed April 30, 1953, on behalf of John R. Menke. It is evident that each type of reactor has certain advantages and disadvantages. It is seen that the breeding gain of a fast reactor is highest but that the inherent danger of a fast reactor is also highest due largely to the extremely short neutron lifetime therein. That patent application discloses and claims a composite reactor containing coupled thermal and fast regions which to a considerable degree combines the advantages of fast reactors and of slow reactors.

In the Menke et al. reactor the power is primarily generated in the fast region to obtain a breeding gain characteristic of a fast reactor. Also, according to one embodiment, described in the Menke et al. application, the fast region is shielded from low energy neutrons originating in the thermal region to keep the energy of neutrons causing fissions in the fast region high so as to attain a low value for the capture to fission ratio and to prevent a hot spot at the edge of the fast region. This shielding is obtained by means of a thin layer of a slow neutron absorbing material between the fast region and slow region.

The present invention represents an improvement over the above-described reactor.

It is accordingly an object of the present invention to provide a novel reactor having coupled fast and thermal regions.

It is a further object of the present invention to provide a reactor which is easy to control and yet has a high breeding ratio.

It is still another object of the present invention to provide a nuclear reactor having the relatively long neutron lifetime characteristic of a thermal reactor and a relatively high breeding ratio characteristic of a fast assembly.

It is a more specific object of the present invention to provide a coupled fast-thermal reactor in which shielding of the fast region from low energy neutrons is accomplished by means of a composition which prevents slow neutrons from reaching the fast region while giving rise to fast neutrons for coupling.

These and other objects of the invention are attained by a reactor having a region having a fast operating energy level and a region having a slow operating energy level containing both fertile material and fissionable material in which both regions are free of moderating material and the fast region is isolated from low energy neutrons by the region having a slow operating energy level. As will become apparent from the subsequent discussion the region having a slow operating energy level has a threefold purpose; it serves as core for the thermal system and is thus a source of fast neutrons for coupling with the fast region, as barrier for low energy neutrons and fast region and as reflector for the fast region.

A specific reactor will be described which consists of a 400 liter plutonium-239 fueled, sodium cooled, fast core surrounded by a 10 cm. inner blanket annulus containing natural uranium, sodium coolant and structural material, but no moderator. Outside the inner blanket in the radial direction there is a 30 cm. annulus of beryllium which in turn is surrounded by an outer blanket of depleted uranium.

The invention will now be described with reference to the accompanying drawings wherein:

FIG. 1 is a vertical sectional view of a nuclear reactor according to the present invention;

FIG. 2 is an enlarged sectional view taken along the line 2—2 in FIG. 1 and looking in the direction of the arrows;

FIG. 3 is a sectional view taken along the line 3—3 in FIG. 1 and looking in the direction of the arrows;

FIG. 4 is an elevational view of a fuel element;

FIG. 5 is an enlarged elevational view of a fuel element taken partially in cross section showing its relationship to an adjacent fuel element;

FIG. 6 is a cross sectional view taken on line 6—6 of FIG. 5;

FIG. 7 is a cross sectional view taken on line 7—7 of FIG. 5;

FIG. 8 is a cross sectional view taken through an inner blanket element;

FIG. 9 is a view showing the arrangement of elements within the outer blanket;

FIG. 10 is a vertical schematic view of the reactor according to the present invention;

FIG. 11 is a graph showing radial flux distribution within the reactor; and

FIG. 12 is a graph showing radial fission distribution within the reactor.

A general description of the reactor of the present invention will first be made with reference to FIG. 10. The reactor comprises essentially a central cylindrical core 20, an annular inner blanket 21 surrounding the core, an annular reflector zone 22 surrounding the inner blanket 21, and an outer blanket 23 surrounding the reflector zone 22. The reactor is contained within a tank 24 provided with a cover 25. A conventional concrete shield (not shown) surrounds the tank 24.

In one particular construction of the nuclear reactor which will be used to illustrate the present invention throughout the specification, tank 24 is 300 cm. in height and 190 cm. in diameter and is constructed of AISI type 304 stainless steel, central core 20 is 80 cm. in diameter, inner blanket 21 is 10 cm. in thickness, reflecting zone 22 is 30 cm. in thickness and outer blanket 23 is 15 cm. in thickness.

The reactor includes a fuel region 26 made up of a fast region 27, comprising the middle portion of the central core 20, and a thermal region 28, comprising the middle portion of the inner blanket 21. Surrounding the fuel region 26 is a reflector 29 comprising the middle portion of the reflector zone 22.

Upper and lower blankets 30 and 31, respectively, complete the enclosure of the fuel region 26 and reflector 29.

Both fast region 27 and thermal region 28 contain fissionable and fertile material, thermal region 28 containing a higher proportion of fertile material than does fast region 27. As will become apparent from the more detailed description following, neither fast region 27 nor thermal region 28 contains any moderating material. Although thermal region 28 does not contain any moderating material it constitutes a thermal region because it is surrounded by a reflector 29 containing a moderating material. Neutrons born in fast region 27 will primarily cause fast fissions in that region. Some, however, will be lost to that region and penetrate the thermal region where they may also cause fissions or be reflected back to the fast region 27. Some of the neutrons born in the thermal region will cause fast fissions in that region, some will penetrate the reflector 29 where they will be thermalized and eventually largely reflected back into thermal region 28 to cause thermal fissions therein. Many of the neutrons resulting from these fissions will penetrate the fast region where they will cause fast fissions. Coupling between the thermal zone and the fast zone will thus be high because the thermal region is adjacent to the fast region. At the same time the fertile material in the thermal region will absorb the thermal neutrons not causing fissions therein and prevent them from reaching the fast region.

The purpose of shielding the fast region from low energy neutrons is two-fold; it kept the energy level of the neutrons causing fissions in plutonium-239 high to attain a low value for the capture to fission ratio, and it prevents formation of a hot spot at the edge of the fast region.

The reactor is so designed as to be of less than critical size when fast fissions alone are present. Therefore, effective presence of the reflector is necessary for criticality. It will be noted that the fast and thermal regions are coupled since in each of the regions some of the neutrons causing fissions were born in the other. Neutrons leaving the fuel region and not reflected back by the reflector are utilized to convert fertile material in upper blanket 30, lower blanket 31, and outer blanket 23 to fissionable material.

Details of structure of the reactor will next be described. The central core 20 of the reactor is made up of a plurality of fuel elements 32 which are shown in FIGS. 4 and 5. Fuel elements 32 are formed with three sections; an upper blanket section 33, a fuel section 34, and a lower blanket section 35. Upper and lower blanket sections 33 and 35 form respectively part of upper and lower blankets 30 and 31, and all the fuel sections 34 of fuel elements 32 form the fast region 27 of fuel region 26. Fuel elements 32 are supported between an upper support plate 36 and a lower support plate 37 within an inner tank 38. Central core 20 rests on grid 39 which is supported by angular plates 40.

Fuel elements 32 are formed of a fuel rod 41 encased in cladding 42 about which spirals a rib 43. Fuel rod 41 has a different composition in different sections thereof. Within fuel section 34 of fuel elements 32 rods 41 contain a fissionable material. Within blanket sections 33 and 35 of fuel elements 32 rods 41 are formed of a breeding material.

In the specific embodiment described the fast region 27 of the reactor contains 7678 fuel elements 32. These elements are 0.5 cm. in diameter and 190 cm. in length. The cladding 42 is 0.185 cm. thick and the rib 43 is 0.37 cm. wide and 0.15 cm. thick. The fuel section 34 of the rod 41 consists of an alloy of 13.25 wt. percent plutonium-249 and 86.75 wt. percent uranium-238. This section is 80 cm. in length. Above and below this section are equal lengths of blanket sections, each section being 55 cm. in length and being formed of depleted uranium containing 0.20% uranium-235. The cladding 42 and rib 43 are zirconium.

Lower tips 44 of fuel elements 32 are seated in sockets 45 in lower support plate 37. In order to obtain proper orientation of fuel elements 32, projections 46 on lower tips 44 fit in a notch (not shown) forming part of sockets 45. Sockets 45 are so spaced that fuel elements 32 are spaced apart the width of a rib 43. Since ribs 43 of all fuel elements 32 are oriented the same and have the same pitch, contact of a rib 43 of one fuel element 32 with each adjacent fuel element 32 will ensure that proper spacing of the fuel elements is obtained. As will be apparent from the data previously given, fuel elements 32 will be located 1.24 cm. apart center to center in a triangular lattice.

At the top of each fuel element 32 a restricted portion 47 of an upper tip 48 is located in an opening 49 in upper support plate 36. Coolant circulation apertures 50 are provided in lower support plate 37 and coolant circulation apertures 51 are provided in upper support plate 36.

Central core 20 may be removed from the reactor as a unit and replaced with a fresh core. This is accomplished by lifting the central core assembly of core 20, upper and lower support plates 36 and 37 and inner tank 38 from the reactor by means of a crane. This may be done with safety since center core 20 is safely subcritical by itself.

Inner blanket 21 contains blanket elements 52 which are identical in appearance to fuel elements 32 except for size. A cross-sectional view through a blanket element 52 is shown in FIG. 8. As can be seen the elements consist of a blanket rod 53 encased in cladding 54 with a spiral rib 55 running therearound. Blanket elements 52 are located within a plurality of cans 56 and supported therein between upper and lower support plates 57 and 58 respectively. Means of support are identical to those used for the fuel elements 32. Each can and the blanket rods contained therein may be separately removed from the reactor and replaced.

There are 1620 blanket elements 52 each containing a blanket rod 53 which is 1.0 cm. in diameter, having 0.0185 cm. cladding and with the rib 55 being 0.37 cm. wide and 0.15 cm. thick. The blanket rod 53 is formed of uranium with the middle 80 cm. thereof being natural uranium and the upper and lower 55 cm. thereof being depleted uranium containing 0.21% uranium-235. It is the middle portions of these blanket rods 53 which form the thermal region 28 of the reactor. Blanket elements 52 are located 1.4385 cm. apart center to center in triangular array.

Reflector 29 is formed of stacked arcuate blocks 59 of beryllium metal which are lined with zirconium cladding 59A. The blocks 59 have openings therein which are aligned to form channels 60. The openings are lined with zirconium cladding 61 to protect the beryllium from the action of the coolant. The reflector 29 is the same height as is the fuel region 26 of the reactor and forms an annulus thereabout. A channel 62 is left at the outside of the reflector 29 for a purpose to be described hereinafter.

Above and below the reflector 29 arcuate blocks 63 of depleted uranium containing 0.20% uranium-235 are stacked to form a part of upper and lower blankets 30 and 31. Blocks 63 are lined with zirconium cladding 63A. Blocks 63 are spaced from blocks 59 by I-beams 64 above and below the reflector 29. The blocks 63 have openings therein which are aligned to form channels 64A. Channels 64A are lined with zirconium cladding 65. Channels 64A have approximately twice the diameter of channels 60. All elements comprising the reflector zone 22 are likewise supported by grid 39.

Outer blanket 23 comprises a plurality of assemblies 66 each consisting of an arcuate can 67 containing tightly-packed vertically-disposed depleted-uranium rods 68 extending between upper and lower spacing grids 69 and 70 and filling the area between reflector 29 and tank 24 except for channels 62. A shown in detail in FIG. 9 the ends of rods 68 take the form of truncated cones and fit in conically shaped openings 71 and 72 in grids 69 and 70. Thus grids 69 and 70 have room for openings 73 and 74 respectively between openings 71 and 72 without undue weakening of the grid. Rods 68 are 2.5 cm. in diameter with zirconium cladding 0.2 cm. thick and are 190 cm. long. The depleted uranium contains 0.20% uranium-235. Each individual can 67 can be individually removed from the reactor. Outer blanket 23 is likewise supported by grid 39.

Two inlet pipes for coolant are provided. Pipe 75 introduces coolant into inlet manifold 76. Pipe 77 introduces coolant into a separate inlet manifold 78 above inner blanket 21. The coolant from pipe 75 flows through openings 73 in grid 69 and down past rods 68. It also flows through channels 64A in upper blanket 30. On passing through channels 64A the flow splits with a portion continuing through channels 60 in reflector 29 and the remainder being deflected to the outside of the reflector 29 where it flows through channel 62. At the bottom of reflector 29 the flows join and pass again through channels 64A in lower blanket 31. The reason for this construction is because the reflector requires less coolant than does the upper and lower blanket. Since all the coolant is not needed in the reflector, the unneeded part is directed to the outside thereof. By this construction the efficiency of the reflector is higher than it would be if all the coolant were permitted to pass therethrough.

The coolant from pipe 77 flows through openings (not shown) in upper support plate 57, past blanket elements 52, and through openings in lower support plate 58 in its passage through the inner blanket 21.

The flows from the inner blanket 21, reflector zone 22, and outer blanket 23 pass through openings 79 in grid 39 and then join in plenum chamber 80. The total coolant flow then passes upwardly through apertures 50 in lower support plate 37, past fuel elements 32, through apertures 51 in upper support plate 36, into outlet manifold 81 and outlet pipe 82.

Since it is essential that the fuel region 26 of the reactor be free of moderating material a liquid metal must be used as coolant. Sodium is the preferable coolant although other liquid metals such as NaK, bismuth or lead might also be used.

The control system of the reactor represents one of the important aspects of the invention. Control is achieved by adjustably placing a barrier to thermal neutrons between the reflector 29 and the thermal region 28 of the fuel region 26 in the disclosed reactor. This type of control functions because the reactor is subcritical with respect to fast neutrons alone but supercritical with respect to fast neutrons and thermal neutrons. Since most of the thermal neutrons originate in the reflector 29, the reactor may be shut down by effectively separating the reflector from the fuel region of the reactor and controlled by adjusting the degree of separation.

This is done in accordance with my invention by providing thin but fairly wide curving control sheets of boron steel 83 mounted for vertical movement in channels 84. Sheets 83 are moved by shafts 85 which pass through holes 86 in cover 25. Control sheets 83 may be moved by any conventional means such as a rack and pinion gear provided with a magnetic clutch so that in an emergency the control sheets fall under the action of gravity. It will be understood that it may be desirable to employ additional control means for reasons of neutron economy and safety. For example, provision for the movement of fuel into and out of the fuel region or movement of neutron absorbers into or out of the fuel region may be desirable. A particularly desirable arrangement would be to employ conventional control for ordinary control and to employ the described control as a safety control.

There are 285 kilograms of plutonium in the fast core of the reactor and the multiplication constant thereof is .95. Subcriticality thereof serves as a margin of safety against a prompt excursion.

A similar all fast reactor would contain 320 kilograms plutonium. Although a reactor employing plutonium-239 as fuel has been described, it is clear that other fissionable materials may be employed as fuel. For example, a mass of 410 kilograms uranium-235 for the described coupled reactor would be required while a similar fast reactor would require 460 kilograms.

The reactor is designed to generate heat at 400 megawatts. The inlet temperature of coolant will be determined by the particular system of heat exchangers employed. The exit temperature of coolant and flow rate of coolant are interrelated and may be varied to obtain the desired power. Maximum flow rate is on the order of 35 feet per second.

The reactor is primarily useful for power production. Coolant from the reactor is passed through heat exchangers where it either directly or through an intermediate coolant transforms water into steam. The steam is then employed in a conventional turbine. The reactor is, of course, also useful as a source of radiation as are all nuclear reactors.

FIG. 11 gives the radial flux distribution for the reactor. The flux is normalized to a core output of 400 mw., and is the average over the axial direction.

FIG. 12 gives the radial fission distribution for the reactor. The fast and thermal fissions are distributed among the regions as follows:

TABLE I

|  | (A) | (B) | (C) | (D) |
|---|---|---|---|---|
| Core—fast | .75 | .89 | .78 | .91 |
| Core—thermal | .01 |  | .01 |  |
| Inner blanket—fast | .09 | .05 | .08 | .04 |
| Inner blanket—thermal | .08 |  | .07 |  |
| Remainder of blanket—fast | .03 | .06 | .03 | .05 |
| Remainder of blanket—thermal | .04 |  | .03 |  |

(A) A coupled plutonium-239 reactor.
(B) A plutonium-239 fast reactor.
(C) A coupled uranium-235 reactor.
(D) A uranium-235 fast reactor.

Table II gives neutron inventories for uranium-235 and plutonium-239 systems where A, B, C and D represent the same reactors as in Table I. The normalization is one fission neutron in the core.

TABLE II

*Neutron inventories for coupled and all-fast systems*

| | (A) | (B) | (C) | (D) | (A¹) |
|---|---|---|---|---|---|
| Core: | | | | | |
| Fuel fissions | .289 | .291 | .339 | .341 | .289 |
| Fuel captures | .054 | .048 | .078 | .073 | .054 |
| $U^{235}$ fissions | .065 | .063 | .061 | .059 | .065 |
| $U^{238}$ captures | .220 | .200 | .180 | .160 | .225 |
| Zr captures | .011 | .010 | .010 | .009 | .011 |
| Na captures | .001 | .001 | .001 | .001 | .001 |
| Fission product captures | | | | | .005 |
| Inner Blanket: | | | | | |
| $U^{235}$ fissions | .055 | .005 | .052 | .004 | .015 |
| $U^{235}$ captures | .015 | .001 | .014 | .001 | .004 |
| $U^{238}$ fissions | .025 | .015 | .024 | .014 | .027 |
| $U^{238}$ captures | .200 | .100 | .180 | .090 | .195 |
| $Pu^{239}$ fissions | | | | | .052 |
| $Pu^{239}$ captures | | | | | .024 |
| $Pu^{240}$ captures | | | | | .003 |
| Zr captures | .003 | .002 | .003 | .002 | .003 |
| Na captures | .003 | 0 | .003 | 0 | .002 |
| Xe captures | .005 | 0 | .005 | 0 | .006 |
| Fission product captures | | | | | .002 |
| Moderator: | | | | | |
| Be captures | .020 | | .019 | | .020 |
| Zr captures | .005 | | .005 | | .005 |
| Na captures | .005 | | .005 | | .005 |
| Remainder of Blanket: | | | | | |
| $U^{235}$ fissions | .020 | .007 | .019 | .007 | .022 |
| $U^{235}$ captures | .004 | .002 | .004 | .002 | .004 |
| $U^{238}$ fissions | .010 | .018 | .010 | .016 | .010 |
| $U^{238}$ captures | .250 | .340 | .235 | .312 | .270 |
| Zr captures | .001 | .003 | .001 | .003 | .001 |
| Na captures | .001 | 0 | .001 | 0 | .001 |
| Neutron escapes | .014 | .008 | .014 | .008 | .015 |

¹ After 100 days.

The neutron inventories yield for the breeding ratios

TABLE III

| (A) | (B) | (C) | (D) | (A¹) |
|---|---|---|---|---|
| 1.6222 | 1.808 | 1.232 | 1.313 | 1.581 |

¹ After 100 days.

Thus it is seen that the change from an all fast to a coupled system only reduces the breeding ratio by ~10%.

The neutron lifetime in the coupled systems using either $Pu^{239}$ or $U^{235}$ as fuel is $2 \times 10^{-5}$ seconds while in similar all fast reactors the lifetime is $1.5 \times 10^{-7}$. Thus we see that the neutron lifetime is brought down to the range of (or only slightly shorter than) the lifetime in a thermal water reactor. And this reduction in the lifetime is at loss of only about 10% in breeding ratio.

The invention is of course not restricted to the specific details of hte reactor described. A reactor according to the present invention may be described more broadly by tabulating the volume percentage of components of the different regions thereof.

The dimensions and compositions of a reactor which may be constructed according to the present invention follow:

TABLE IV

| Region | Outer Radius, cm. | Volume Fractions | | | | | |
|---|---|---|---|---|---|---|---|
| | | $Pu^{239}$ | $U^{235}$ | $U^{238}$ | Zr | Na | Be |
| Fast region | 40 | ←———.3———→ | | | .15 | .55 | 0 |
| Thermal region | 50 | 0 | .00324 | .44676 | .1 | .45 | 0 |
| Reflector | 80 | 0 | .0 | .0 | .025 | .025 | .95 |
| Outer blanket | 95 | 0 | .0016 | .7984 | .1 | .1 | 0 |

The composition of the upper and lower blankets is similar to that of the fast and thermal regions and the outer blanket except that depleted uranium, in place of a plutonium-uranium alloy or natural uranium, is used. The relative amounts of plutonium-239 and uranium in the fast region are determined by criticality.

A generalized description of a coupled system may be formulated as follows: First we introduce four integral parameters which are denoted by $k_1$, $k_2$, $p_{12}$, $p_{21}$. In the usual system we need only one corresponding parameter, $k_{eff}$, the multiplication constant, which can be defined as the average number of next generation fission neutrons resulting from a single fission neutron. The criticality condition is then, $k_{eff}=1$. Analogously, one can define $k_1$, the average number of next generation fission neutrons in assembly 2 resulting from a single fission neutron in assembly 2; $p_{12}$, the average number of next generation fission neutrons in assembly 2 resulting from a single fission neutron in assembly 1; $p_{21}$, the average number of next generation fission neutrons in assembly 1 resulting from a single fission neutron in assembly 2. $1-k_1=\Delta_1$, and $1-k_2=\Delta_2$ are measures of the subcriticality of assemblies 1 and 2 on their own, respectively, $p_{12}$ and $p_{21}$ are measures of the coupling between the two assemblies.

The relative power (more correctly, the relative number of fission neutrons), $S_1$ and $S_2$, divides among the two assemblies according to $$\frac{S_1}{S_2}=\frac{p_{21}}{\Delta_1}=\frac{\Delta_2}{p_{12}}$$

since we have that $$S_1=k_1S_1+p_{21}S_2$$

and $$S_2=k_2S_2+p_{12}S_1$$

The condition for criticality is thus $$p_{12}p_{21}=\Delta_1\Delta_2$$

In the following we shall associate 1 with the fast system and 2 with the thermal system.
The relation $$\frac{S_1}{S_2}=\frac{p_{21}}{\Delta_1}$$

is especially useful in discussion of the requirements that are necessary for a good design.

We would like a high value for $$\frac{S_1}{S_2}$$

(i.e., we want most of the power to be generated in the fast part in order to have a breeding gain characteristic of fast reactors). We therefore want $p_{21}$ to be as large as possible.

The requirements on $\Delta_1$ are conflicting. We want it small (i.e., the fast system close to criticality) in order to have $$\frac{S_1}{S_2}$$

large and we want $\Delta_1$ appreciable from safety considerations. The more subcritical the fast system, the longer the lifetime; one might also say the less likely the system to go prompt critical on fast neutrons alone. However, probably not much further is gained along these lines in going above some small value for $\Delta_1$, say, ~.05. In the process of getting enough reactivity into the fast system to make it critical on its own, the reactivity of the overall system will have increased to such an extent that it would have disassembled itself sufficiently to shut off the entire system. This would have occurred while the system still had the essential kinetics of a thermal system.

Another reason for not making $\Delta_1$ too large is that less necessary flexible control is advantageous, and in general, as $\Delta_1$ decreases, the smaller the effect on overall reactivity of effects like Xe poison in the thermal part.

There is no difficulty associated with making $\Delta_1$ any value we wish (provided the other parameters are such as to satisfy the criticality equation), so that to some extent its value is a matter to be decided after consideration of the various above factors. In any case, the larger the value of $p_{21}$, the easier it will be to obtain a suitable compromise value of $\Delta_1$.

Consideration of these parameters then makes it readily apparent why the particular arrangement claimed was chosen. The advantage of establishing a thermal region as an inner blanket even though it contains no moderator results from the fact that a primary design consideration is to make $p_{21}$ as large as possible subject to the restriction that a barrier be placed to low energy neutrons going from the thermal region to the fast region. $p_{21}$ will be large since the thermal region is immediately adjacent the fast region. The thermal region is itself the barrier preventing low energy neutrons from entering the fast region since most low energy neutrons originate in the reflector and have to completely traverse the thermal region to reach the fast region.

It will be understood that this invention is not to be limited to the details given herein but that it may be modified within the scope of the appended claims.

What is claimed is:

1. A nuclear reactor having a fuel region entirely free of moderating material, a beryllium reflector located about said fuel region, and an outer blanket of depleted uranium located about said beryllium reflector, said fuel region comprising a cylindrical central core containing 285 Rg. plutonium which is 80 cm. in diameter and an annular blanket containing natural uranium surrounding said central core which is 10 cm. in thickness.

2. A nuclear reactor according to claim 1 in which the central core is 80 cm. in height and consists of a total of 30 volume percent plutonium-239 and uranium, 15 volume percent structural material and 55 volume percent coolant and the natural uranium blanket consists of 45 volume percent natural uranium, 10 volume percent structural material and 45 volume percent coolant.

References Cited in the file of this patent

UNITED STATES PATENTS

| | | |
|---|---|---|
| 2,812,303 | Daniels | Nov. 5, 1957 |
| 2,837,476 | Busey | June 3, 1958 |

OTHER REFERENCES

ANL 5775, Coupled Aspects of a Fast-Thermal Critical: 2PR–V, Toppel, October 1957.

M–3753, declassified May 9, 1956, 13 pages, Technical Information Service, Oak Ridge, Tenn.

Mon P–412—Sept. 25, 1947, declassified Sept. 27, 1956, 13 pages, Technical Information Service, Oak Ridge, Tenn.

"International Conference on the Peaceful Uses of Atomic Energy," vol. 3 Barnes et al., pp. 330–344, Lichtenberger et al. pp. 345–360 Aug. 1955 U. N. Publication, N.Y.